United States Patent [19]

Wood

[11] Patent Number: 4,782,569
[45] Date of Patent: Nov. 8, 1988

[54] METHOD FOR MANUFACTURING A ROLLING PISTON ROTARY COMPRESSOR

[75] Inventor: Mark W. Wood, Erie, Mich.

[73] Assignee: The DeVilbiss Company, Toledo, Ohio

[21] Appl. No.: 98,649

[22] Filed: Sep. 21, 1987

[51] Int. Cl.⁴ ............................................. B23P 15/00
[52] U.S. Cl. .................................. 29/156.4 R; 29/450
[58] Field of Search ................. 29/156.4, 450; 418/63, 418/243, 244, 245, 246, 247, 248, 249, 250, 251; 417/902

[56] References Cited

U.S. PATENT DOCUMENTS 4,510,659 4/1985 Okazaki .......................... 29/156.4 R
4,605,362 8/1986 Stingion et al. ................ 29/156.4 R

FOREIGN PATENT DOCUMENTS 0156292 12/1980 Japan ............................. 29/156.4 R
0101289 6/1985 Japan ................................. 29/156.8

Primary Examiner—Howard N. Goldberg
Assistant Examiner—Irene Cuda
Attorney, Agent, or Firm—MacMillan, Sobanski & Todd

[57] ABSTRACT

A method for manufacturing a rolling piston rotary compressor in which a cylinder block is adjusted during manufacture to provide a desired vane slot width. The cylinder block is provided with a thin walled section located radially out from the vane slot. The thin walled section is plastically deformed during manufacture to provide a desired vane slot width for receiving a previously finished blade having a known thickness.

6 Claims, 3 Drawing Sheets

METHOD FOR MANUFACTURING A ROLLING PISTON ROTARY COMPRESSOR

TECHNICAL FIELD

The invention relates to manufacturing rolling piston rotary compressors and more particularly to a method for adjusting the vane slot width when manufacturing the cylinder block for a rolling piston rotary compressor.

BACKGROUND ART

Rolling piston rotary compressors include a cast metal cylinder forming a bore in which an eccentrically mounted roller rotates. A spring loaded blade or vane located in a slot in the cylinder block contacts the surface of the roller. As the roller is advanced around the cylinder bore, the blade reciprocates. An inlet port is located on one side of the blade to allow gas to enter an intake or suction chamber between the blade, the rotating roller and the cylinder. A discharge port is located on the opposite side of the blade to discharge compressed gas from a high pressure or compression chamber as the roller rotates. A compressor of this type is shown, for example, in U.S. Pat. No. 4,629,403.

In manufacturing a rolling piston rotary compressor, the cylinder block is cast from a metal such as iron or an aluminum alloy. After casting, the bore and the vane slot are finished by machining. It is necessary for obtaining a very close tolerance between the reciprocating blade or vane and the vane slot in the cylinder block to prevent loss of efficiency and loss of lubricating oil. Accordingly, in assembling the compressor, the width of the finished vane slot is accurately measured and a blade having a dimension for providing a desired tolerance is selected. This necessitates the high costs of either machining the blade to the desired dimensions after finishing and measuring the vane slot width of inventorying blades of different known dimensions and selecting a blade having the correct dimension for the finished slot.

DISCLOSURE OF INVENTION

According to the invention, an improved method is provided for manufacturing a rolling piston rotary compressor. The method involves adjusting the vane slot width in the machined cylinder block to match a previously finished blade during manufacture of a rolling piston rotary compressor. The cylinder block is cast from a desired metal and the bore and vane slot are finished as in the prior art. According to the method, the blade is finished and its thickness is accurately measured to determine the required slot width. The cylinder block is plastically deformed at a thin walled section located radially outwardly from the slot to open the slot to the width required for the previously measured blade. The compressor then is assembled in a conventional manner. The method eliminates the need to finish the blade to a required dimension or the need to inventory many blades of different dimensions, thus reducing the costs of manufacturing the compressor.

Accordingly, it is an object of the invention to provide an improved method for manufacturing a rolling piston rotary compressor.

Another object of the invention is to provide an improved method for manufacturing a cylinder block having a desired vane slot width for a rolling piston rotary compressor.

Other objects and advantages of the invention will be apparent from the following description and the accompanying drawings.

BEST MODE FOR CARRYING OUT THE INVENTION

Figure 1:
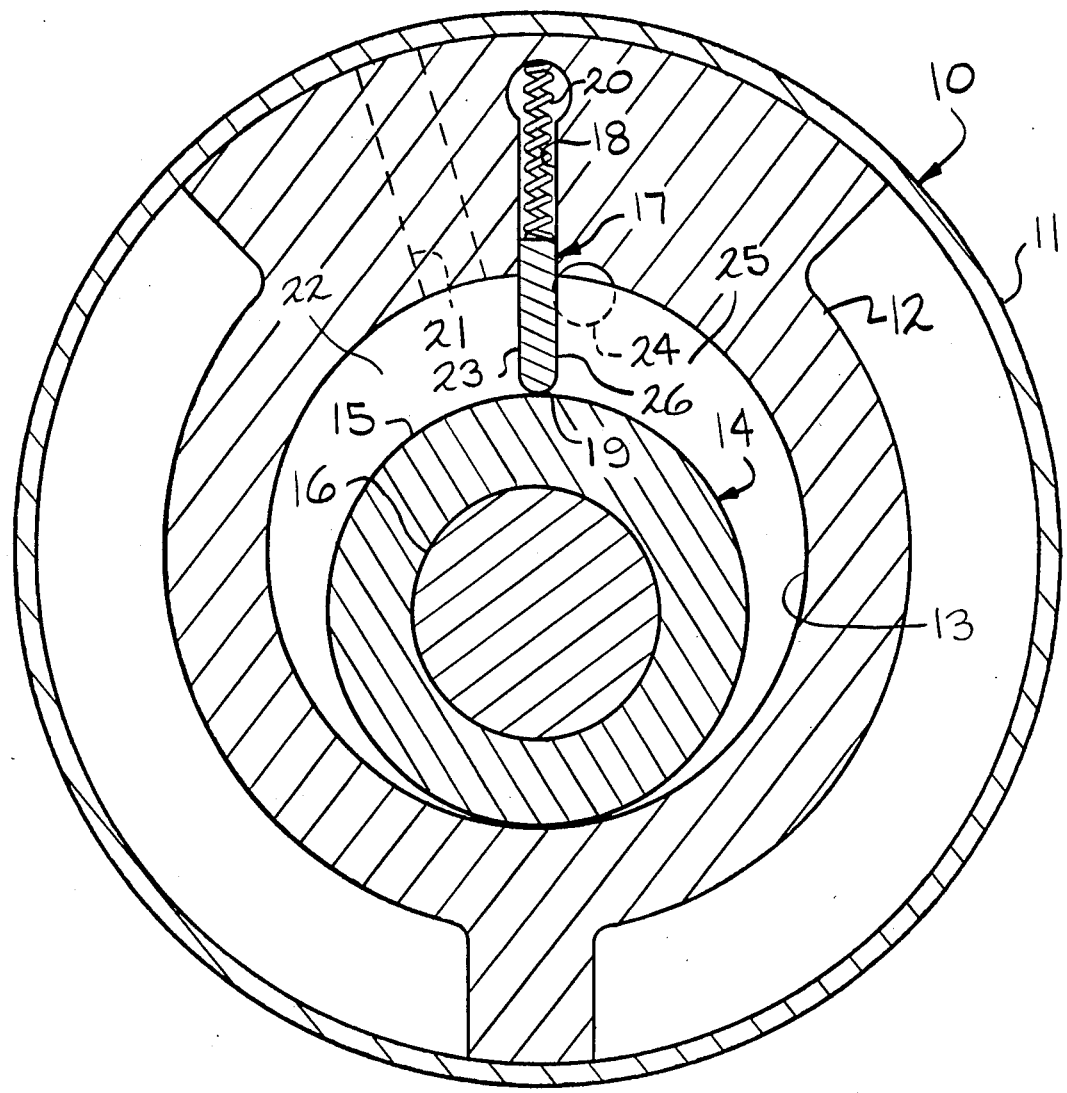
FIG. 1 is an elevational view, in cross-section, through an exemplary rolling piston rotary compressor.

Referring to the drawings and particularly to FIG. 1, a rolling piston rotary compressor 10 is illustrated in section. The compressor 10 may be of any well known design and may, for example, be a hermetically sealed compressor used for compressing a refrigerant in a refrigerator, a freezer, an air-conditioner, or the like. The compressor 10 includes a housing 11 which enclosed and supports a cylinder block 12. The cylinder block 12 has a finished central bore 13 in which a rolling piston 14 is disposed. The piston 14 is formed from a roller 15 mounted on a crank shaft eccentric 16. A vane or blade 17 is positioned to reciprocate in a vane slot 18 located in the cylinder block 12. The vane slot 18 extends radially with respect to the bore 13. The blade 17 has an end 19 which is held in contact with the surface of the rolling piston 14 by means of a spring 20 located in the vane slot 18.

In the illustrated compressor 10, the piston 14 is shown as rotating in a counterclockwise fashion. As the piston 14 rotates, gas is sucked through an intake port 21 into an intake or suction chamber 22 defined between one side 23 of the blade 17, the wall of the bore 13 and the piston 14. At the same time, compressed gas is forced through a discharge port 24 from a compression chamber 25 defined between an opposite side 26 of the blade 17, the wall of the bore 13 and the piston 14. It should be understood that the compressor 10 is of conventional design and will have many additional structural elements which are not shown for the purposes of this disclosure.

The conventional prior art method for manufacturing and assembling the cylinder block 12 and the blade 17 in manufacturing the compressor 10 includes the steps of casting and finishing the cylinder block 12. After the vane slot 18 is finished, its width is accurately measured. Either a blade 17 is manufactured to dimensions calculated to provide the required clearance with the measured vane slot, or a blade 17 is selected from an inventory of different dimensioned blades which are sorted by size. These manufacturing and assembly steps involved unnecessary expense in manufacturing the compressor.

Figure 2:
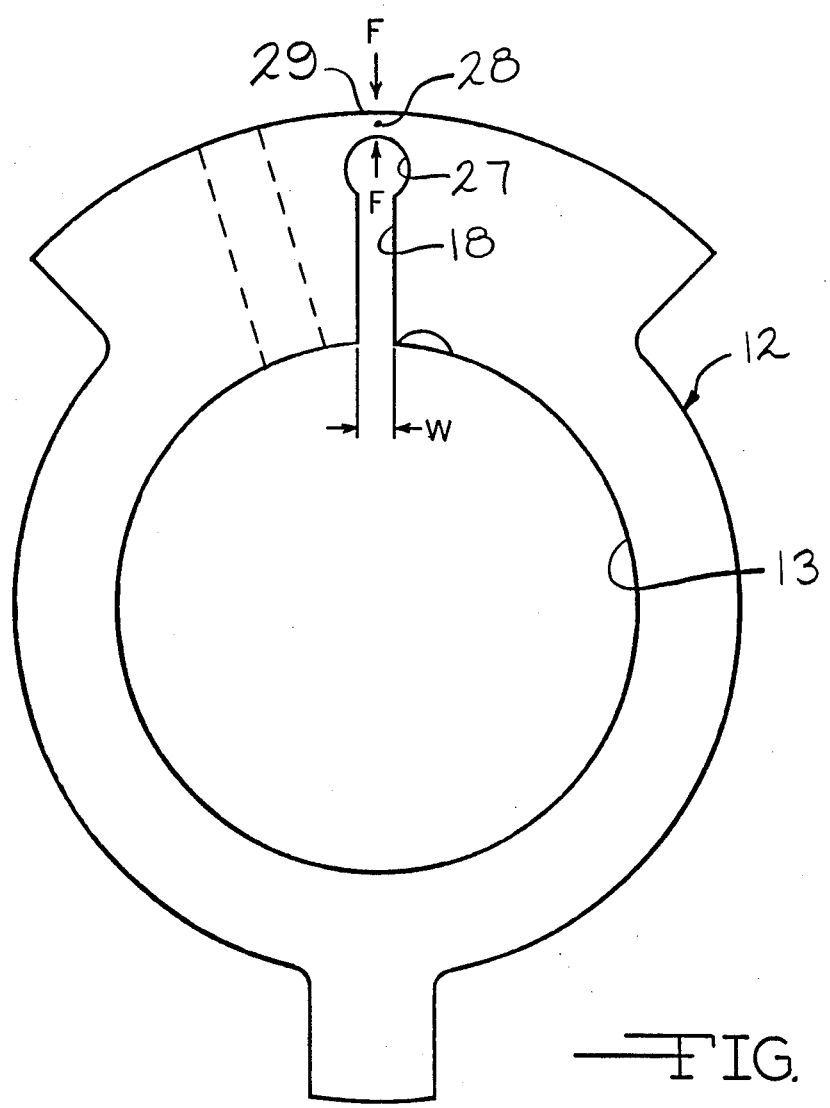
FIG. 2 is an elevational view, in cross-section, through the cylinder block of a rolling piston rotary compressor illustrating the method of the invention.

FIG. 2, which illustrates one embodiment of the method of the invention, shows the cylinder block 12 during manufacture. After the cylinder block 12 is cast, the bore 13 and the vane slot 18 are finished in a conventional manner. It will be seen that the vane slot 18 extends from the bore 13 to a bore 27 which provides clearance for the spring 20 and the blade 17 (FIG. 1).

The cylinder block 12 has a relatively thin walled section 28 between the bore 27 and an outer surface of the cylinder block 12. The blade is manufactured with a finished thickness greater than that required for the width W of the vane slot 18. The blade width is measured and the slot width W is adjusted to provide the desired tolerance with the blade 17. The vane slot width W is adjusted by applying a force F to plastically deform the thin walled cylinder block section 28, thereby increasing the vane slot width W. As the force F is applied, the slot width W is measured and the force F is increased until the desired free width W is achieved.

The method of adjusting the vane slot width W to accommodate a previously finished blade reduces the cost of manufacturing the blade to a precise dimension or eliminates the expense of maintaining an inventory of blades with a variety of dimensions.

Figure 3:
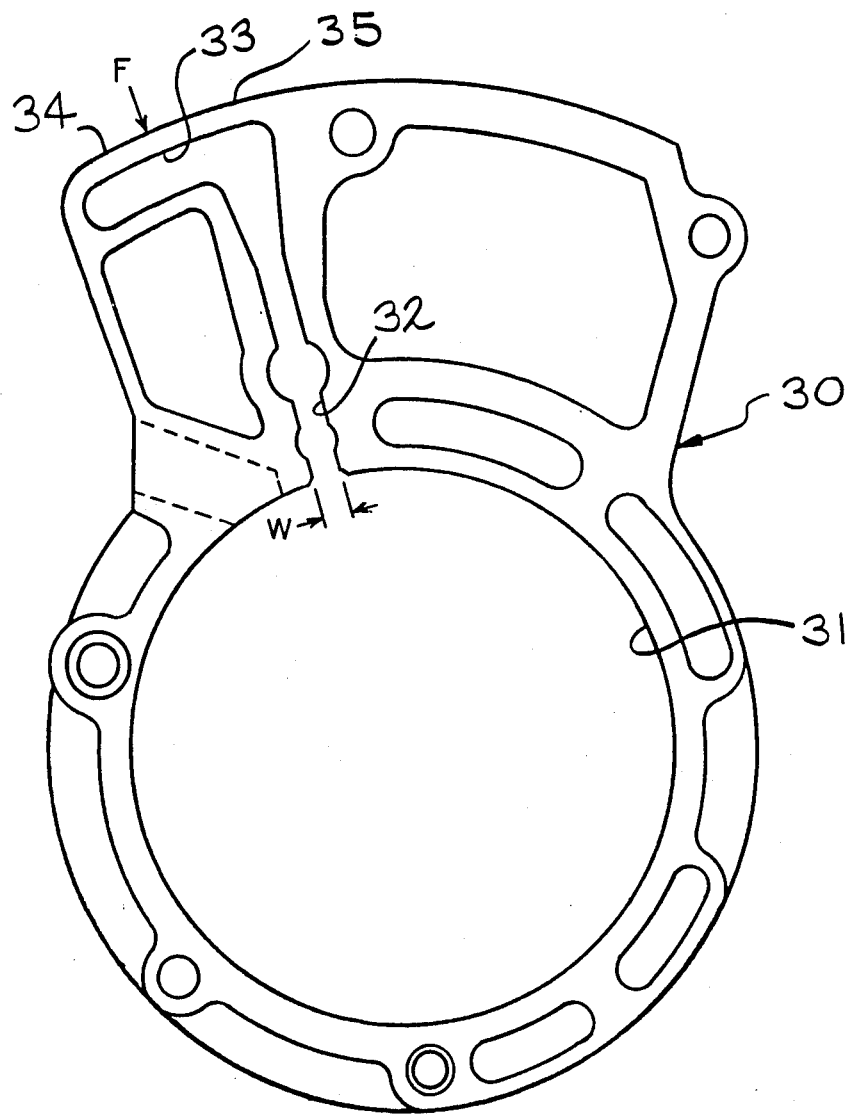
FIG. 3 is an elevational view, in cross-section, through a modified cylinder block of a rolling piston rotary compressor illustrating a modified embodiment of the invention.

FIG. 3 shows a modified cylinder block 30 having a bore 31. A vane slot 32 extends from the bore 31 to a chamber 33 which extends in a generally circumferential direction. The cylinder block 30 has a thin walled section 34 between the chamber 33 and an outer surface 35. Both the outer surface 35 and the thin walled section 34 are initially arcuate shaped. During manufacture of the cylinder block 30, the vane slot 32 initially has a width W equal to or slightly less than the finished thickness of the thinest blade which could be located in the vane slot 32. The thickness of the finished blade is measured and the desired vane slot width W is determined to provide a desired clearance between the blade and the slot. While measuring the slot width W, a force F is applied to the outer surface 35 at the thin walled section 34, as necessary, to plastically deform the thin walled section 34 from its initial arcuate shape to a cord. The deformation of the arc into a cord will increase the vane slot width W. The vane slot 32 is then adjusted to obtain the desired free width W after the force F is removed.

It will be appreciated that only exemplary cylinder blocks for rolling piston rotary compressors have been described and illustrated. The method of the invention can be applied to other cylinder block configurations without departing from the spirit and the scope of the following claims.

I claim:

1. A method for manufacturing a cylinder block for a rolling piston rotary compressor comprising the steps of forming a cylinder block having a cylinder bore and a vane slot extending from said bore to a thin walled section, finishing the vane slot to a width less than the thickness of a vane to be inserted into said vane slot, and plastically deforming the thin walled section to expand the vane slot to a desired width for receiving said vane.

2. A method for manufacturing a cylinder block for a rolling piston rotary compressor, as set forth in claim 1, wherein said thin walled section is deformed from an arc to a cord.

3. A method for manufacturing a cylinder block for a rolling piston rotary compressor, as set forth in claim 1, wherein said thin walled section is deformed by decreasing the thickness of said thin walled section.

4. A method for manufacturing a rolling piston rotary compressor comprising the steps of forming a cylinder block with a cylinder bore and a vane slot extending from said bore to a thin walled section, finishing the cylinder and the vane slot, said finished vane slot having a width, manufacturing a blade having finished surfaces and a thickness greater than the finished vane slot width, measuring the blade thickness, determining a desired vane slot width from the measured blade thickness, plastically deforming the thin walled section to expand the vane slot width to the desired width, and completing manufacture of the compressor.

5. A method for manufacturing a rolling piston rotary compressor, as set forth in claim 4, wherein said thin walled section is deformed from an arc to a cord.

6. A method for manufacturing a rolling piston rotary compressor, as set forth in claim 4, wherein said thin walled section is deformed by reducing the thickness of said thin walled section.

* * * * *